(12) United States Patent
Marritt

(10) Patent No.: US 6,776,830 B2
(45) Date of Patent: Aug. 17, 2004

(54) AQUEOUS INK COMPOSITION FOR USE IN AN INK-JET PRINTER

(75) Inventor: William Marritt, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 56 days.

(21) Appl. No.: 10/123,012

(22) Filed: Apr. 15, 2002

(65) Prior Publication Data
US 2002/0185038 A1 Dec. 12, 2002

(30) Foreign Application Priority Data

| Apr. 17, 2001 | (JP) | 2001-118759 |
| Apr. 26, 2001 | (JP) | 2001-129853 |
| Oct. 10, 2001 | (JP) | 2001-312943 |
| Oct. 10, 2001 | (JP) | 2001-312944 |

(51) Int. Cl.$^7$ ............................................. C09D 11/02
(52) U.S. Cl. ........................ 106/31.68; 106/31.86; 106/31.75
(58) Field of Search .................. 106/31.86, 31.68, 106/31.75; 347/100

(56) References Cited

U.S. PATENT DOCUMENTS

| 5,709,737 | A | * | 1/1998 | Malhotra et al. | 106/31.43 |
| 5,753,021 | A | * | 5/1998 | Martin | 106/31.68 |
| 5,961,703 | A | * | 10/1999 | Fraas | 106/31.29 |
| 6,120,590 | A | * | 9/2000 | Miyamoto et al. | 106/31.6 |
| 6,171,381 | B1 | * | 1/2001 | Yoshimura et al. | 106/31.6 |
| 6,241,811 | B1 | * | 6/2001 | Sano | 106/31.85 |
| 6,290,978 | B2 | * | 9/2001 | Mak et al. | 424/401 |
| 6,325,845 | B1 | * | 12/2001 | Kurihara et al. | 106/31.68 |
| 6,458,192 | B1 | * | 10/2002 | Tsujio | 106/31.32 |
| 6,506,240 | B2 | * | 1/2003 | Takemoto et al. | 106/31.36 |
| 6,599,352 | B1 | * | 7/2003 | Miyamoto et al. | 106/31.36 |
| 2003/0079646 | A1 | * | 5/2003 | Lee et al. | 106/31.36 |
| 2003/0106462 | A1 | * | 6/2003 | Yatake et al. | 106/31.59 |

FOREIGN PATENT DOCUMENTS

WO   WO 01/96483 A1   12/2001

* cited by examiner

Primary Examiner—Mark L. Bell
Assistant Examiner—Veronica F. Faison
(74) Attorney, Agent, or Firm—Ladas & Parry

(57) ABSTRACT

It is an object of the present invention to provide a pigment dispersed aqueous ink composition for use in ink jet printing which gives reliable printing performance and yields rapidly drying printed images with levels of color bleed, which are equal to or better than those obtained from comparable dye based inks. According to the present invention, there is provided a pigment dispersed aqueous ink jet ink composition comprising water as the principal solvent, a water-soluble organic solvent, and a polysaccharide compound represented by the formula:

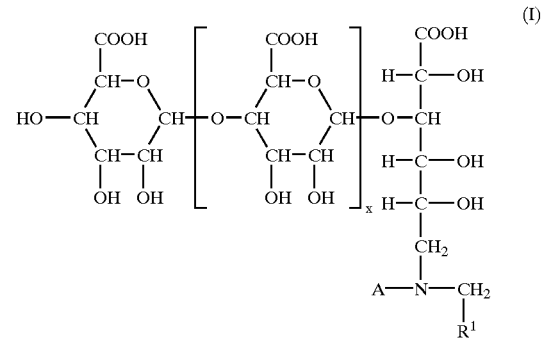

wherein A represents a polyamine.

17 Claims, No Drawings

AQUEOUS INK COMPOSITION FOR USE IN AN INK-JET PRINTER

BACKGROUND OF THE INVENTION

1. Field of the Invention

The present invention relates to a pigment dispersed aqueous ink composition containing a certain polysaccharide compound as a pigment dispersant.

2. Background Art

Ink jet printing is a non-impact printing process in which the printer produces droplets of ink in response to digital signals, such as those generated by a computer. The droplets of ink are deposited on a substrate such as paper or transparent film. Ink jet printers have found broad commercial acceptance due to their print quality, low cost, relatively quiet operation, and graphics capability. Thermal (bubble jet) and piezoelectric drop-on-demand printers have been especially successful in the marketplace and have found broad application as printers for personal computers in the office and the home.

The inks used in ink jet printers can be classified as either dye based inks or pigment based inks. Dye based inks are satisfactory for many applications but have poor light fastness and poor water resistance. As a printed document is expected to have a certain degree of permanency, the lack of light fastness and water resistance of the printed image derived from dye based inks is a significant problem. Pigment based inks can be prepared which have excellent light fastness and water resistance and are preferred over dye based inks for generating printed documents with a reasonable degree of permanency.

In spite of the permanency advantage of pigments over dyes, the introduction of pigment-based inks into the consumer ink jet printer market has been very limited. One reason for this is that formulating pigment based inks for use in ink jet printing which give reliable printing performance and yield rapidly drying printed images with levels of color bleed, which are equal to or better than those obtained from comparable dye based inks has proven to be very difficult.

Some dye based inks, for use in ink jet printing, which give reliable printing performance and are rapidly drying, are already formulated and typically contain a water as the principal solvent, at least one humectant cosolvent, at least one penetrating cosolvent, at least one surfactant, and at least one dye. The combination of the penetrating cosolvent(s) and the surfactant(s) results in an ink composition which has a surface tension in the range of 30 to 40 dyne/cm and which penetrates porous media, such as paper, very rapidly. These low surface tension penetrating inks give high area coverage per drop. High per drop coverage is economically desirable since less ink is used per page. The fast penetrating ability of these dye based inks results in printed images which show negligible color bleed. Color bleed is defined herein as the mutual invasion of one color into another color which can occur when two different color inks are printed adjacently. Negligible color bleed results in a border between the two color regions which is clean and free from invasion of one color into the other.

The problem with formulating pigment based inks, which have low surface tensions and which penetrate porous media very rapidly, is that commonly used penetrating cosolvents and surfactants destabilize most pigment dispersions. Specifically, the penetrating cosolvents and surfactants cause flocculation of the pigment dispersion by displacing pigment dispersants from the surfaces of the pigments. Approaches to make pigment dispersants flocculation-resistant have tended to result in inks in which bubbles form easily. Although, such inks are printable at relatively slow speeds, they cannot be ejected reliably at acceptably fast print speeds in either thermal (bubble jet) or piezoelectric drop-on-demand printers.

Thus, there remains a need for a pigment dispersed aqueous ink composition for use in ink jet printing which can be formulated using a combination of penetrating cosolvents and surfactants, and yet, which gives reliable printing performance at acceptably fast print speeds. There remains a need for a pigment dispersed aqueous ink composition which can be formulated using a combination of penetrating cosolvents and surfactants such that rapidly drying printed images with levels of color bleed, which are equal to or better than those obtained from comparable dye based inks, can be obtained.

SUMMARY OF THE INVENTION

The inventor of the present invention has now found that a certain polysaccharide compound can be used as a pigment dispersant.

Accordingly, it is an object of the present invention to provide a pigment dispersed aqueous ink composition for use in ink jet printing which gives reliable printing performance and yields rapidly drying printed images with levels of color bleed, which are equal to or better than those obtained from comparable dye based inks.

According to the present invention, there is provided a pigment dispersed aqueous ink jet ink composition comprising water as the principal solvent, a water-soluble organic solvent, and a polysaccharide compound represented by the formula:

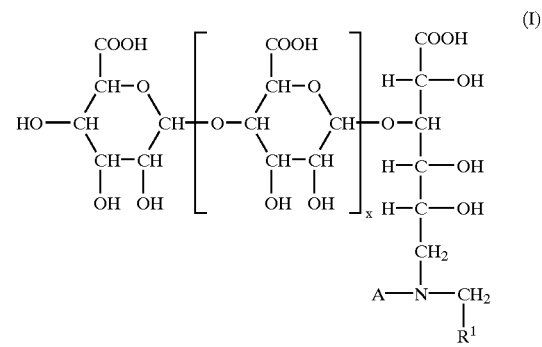

wherein

A represents a group represented by the following formula (i) or (ii):

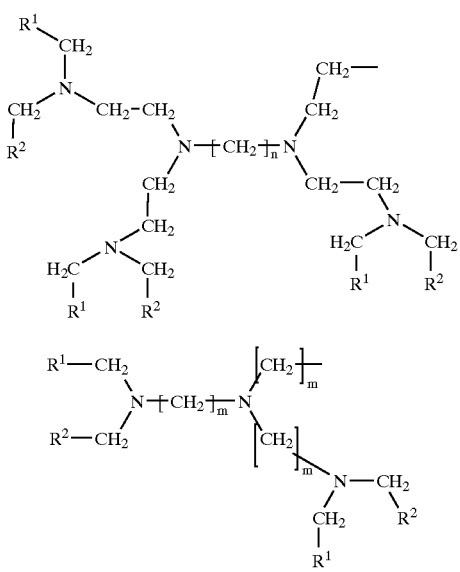

x is the average value for the compound of the formula (I) in the ink composition and is in the range from 4 to 14, n is in the range from 2 to 12, m is either 2 or 3, and $R^1$ and $R^2$ independently represent a $C_{5-20}$ aryl group which may be substituted, an aralkyl group which may be substituted, and the heterocyclic ring containing at least one nitrogen atom, which ring may be substituted.

DESCRIPTION OF THE PREFERRED EMBODIMENTS

The ink composition of the present invention is suitable for use in an ink jet printer using any of the methods known in the art for ejecting ink through a plurality of nozzles contained on a print head. The ink composition for the present invention may also be used in a writing instrument such as a pen, in which the conditions for use of the ink are less stringent than those of an ink jet printer.

Pigment Dispersant

The pigment dispersant of the present invention is a polysaccharide compound represented by the general formula (I).

Examples of the $C_{5-20}$ aryl group represented by $R^1$ and $R^2$ includes phenyl, naphthyl, fluorenyl, and anthryl. The aryl part of the aralkyl group preferably represents $C_{5-20}$ aryls such as described above. The alkyl part of the aralkyl group which is represented by $R^1$ and $R^2$ may be a $C_{1-6}$ alkyl group optionally substituted by a $C_{1-6}$ alkyl group (e.g. methyl) and also may be a $C_{1-6}$ alkenyl group and a $C_{1-6}$ alkynyl group. Furthermore, the alkyl part may be an alkyl group containing an oxygen atom, such as a $C_{1-6}$ alkoxy-$C_{1-6}$ alkyl group.

Examples of the heterocyclic ring containing at least one nitrogen atom which is represented by $R^1$ and $R^2$ include pyridyl, quinolyl, and N-methyl-phthalimido.

The aryl and aralkyl groups and the heterocyclic ring represented by $R^1$ and $R^2$ may be optionally substituted by one or more substituents which are selected from the group consisting of a halogen atom such a fluorine, chlorine, bromine and iodine; a $C_{1-6}$ alkyl group which may be substituted by a halogen atom such as fluorine, chlorine, bromine and iodine, a nitro group; a cyano group; a carboxyl group; a hydroxyl group; a boronic acid group; a sulfonic acid group; a $C_{1-6}$ alkoxy group which may be substituted by a halogen atom such as fluorine, chlorine, bromine and iodine; a $C_{1-6}$ alkylcarbonyloxy group; and a —O—$C_{1-6}$ alkylene —O— group.

The amount of the compound represented b the formula (I) in the ink composition is preferably 0.1 to 20% by weight.

In the ink composition of the present invention, the compound of the formula (I) acts as a good pigment dispersant. In particular, the compound of the formula (I), even with a penetrating solvent or surfactant which typically destabilizes most pigment dispersions, keeps the pigment dispersions stable in the ink composition without causing flocculation. Without intending to be bound by theory, it is believed that the compound of the formula (I) is capable of binding to the pigment surfaces by both van der Waals attactive forces and ionic bonds. Most conventional pigment dispersants are held to the pigment surfaces only by weak van der Waals attractive forces. The penetrating solvents and surfactants typically displace the dispersants from the surfaces of the pigments causing flocculation or the pigment dispersions. It is believed that, by virtue of the ionic bonds between the compound of the formula (I) and the pigment surfaces, the dispersant of the formula (I) are not displaced from the surfaces of the pigment and in ink compositions containing the penetrating solvents and surfactants. The ionic bonds can successfully form when the charge of the pigment surface is opposite to that of the absorbing portion of the dispersant. According to the findings of the present inventor, for pH values of the ink composition in the range of about 5 to 10, the groups of the formulae (i) and (ii) in the formula (I) will be partially protanated, and thus, will have a positive charge. Most of the pigments commonly used have negatively charged surfaces. (Charging data has been reported in Macholdt, H. T., Sieber, A. Dyes and Pigments. vol.9, pp. 119–127, 1988). Accordingly it is preferable that the pH value of the ink composition according to the present invention is in the range of the slightly acidic to alkaline in view of the stability of the pigment dispersion.

The polysaccharide chain in the compound of the formula (I) ("the polysaccharide portion") is derived from a polysaccharide compound represented by the general formula (II) shown below:

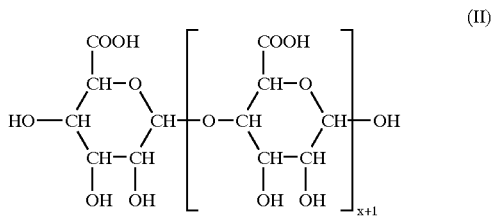

(wherein x is the average value for the polysaccharide unit and is in the range from 4 to 14.)

Polysaccharides of this type are readily extracted from natural materials, especially seaweeds and fruits skins. In their natural forms, such seaweed- and fruit-skin-extracted polysaccharides typically have average degrees of polymerization greater than about 250. Thus, to obtain polysaccharides for use in the dispersants of the present invention, it is necessary to selectively depolymerize the natural polysaccharides. The compound of the formula (II) in which x is in the range from 4 to 14, has a corresponding average degree of polymerization in the range from 6 to 16.

According to the present invention, the compound of the formula (II) may be a monodisperse or polydisperse mixture of the polysaccharide compounds. In practice, the compound of the formula (II) that is derived from natural materials is a polydisperse mixture. Dispersity of the compound of the formula (II) is the polymer weight average molecular weight divided by the number average molecular weight, both of which can be obtained from size exclusion chromatography, using columns calibrated with polymer standards of known molecular weights. The polysaccharide represented by the formula (II) and the corresponding compound of the formula (I) typically have the polysaccharide portion having dispersity values in the range of 1.2 to 2.0.

The natural seaweed polysaccharide from which the compound of the formula (II) may be obtained is alginic acid. The natural fruit-skin polysaccharide from which the compound or the formula (ii) may be obtained is pectic acid. Both alginic acid and pectic acid are readily depolymerized by acid hydrolysis, periodate treatment followed by acid hydrolysis, or hydrogen peroxide treatment. To someone skilled in the art, these depolymerization reactions may be carried out with a reasonable degree of selectivity such that polysaccharides for use in the present invention are obtained.

According to a preferred embodiment of the present invention, the compound of the formula (I) wherein $R^1=R^2$ in the group of the formula (i) and (ii) may be obtained using two reductive amination reactions. The first reductive amination reaction is carried out using the compound represented by the formula (II) and an excess of the branched polyamino compound represented by the formula (III) or (IV) shown below:

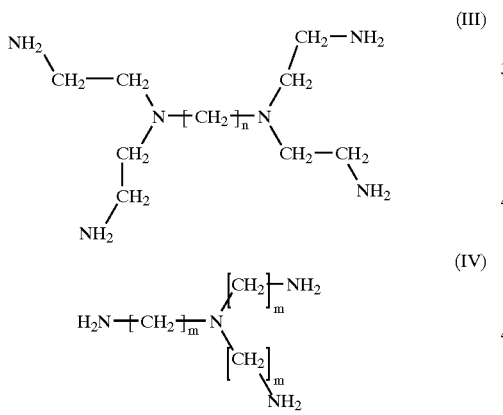

(wherein n is in the range from 2 to 12 and m is 2 or 3.)

The branched polyamine compound of the formula (II) is readily obtained by a double Michael addition of acrylonitrile to both primary amines of an alkyl-diamine followed by heterogeneously catalyzed hydrogenation of the nitriles. The alkyl-diamine starting material has the general formula $H_2N-(CH_2)_n-NH_2$, where n is in the range from 2 to 12. A highly efficient experimental procedure for preparing these branched polyamines is described in de Brabander-van den Berg, E. M. M., Meijer, E. W. Angew. Chem. Int. Ed. Engl. Vol. 32, No. 9, pp. 1308–1311 (1993). Additionally, the branched polyamine, in which n is 4, is commercially available as "Actramol Am1" from DSM New Business Development, The Netherlands.

The branched polyamine compound of the formula (IV) in which m is 2, is tris(2-aminoethyl)amine and is commercially available from Pressure Chemical Co. (Pittsburgh, Pa.; USA) in grades of 90, 95, and 98% purity. The branched polyamine compound of the formula (IV) in which m is 3, is readily obtained by are readily obtained by a triple Michael addition of acrylonitrile to ammonia followed by heterogeneously catalyzed hydrogenation of the nitriles. An experimental procedure for preparing the branched polyamine, in which m is 3, is described in Woerner, C. and Muelhaupt, R. Angew. Chem. Int. Ed. Engl. Vol. 32, No. 9, pp. 1306–1308 (1993). Additionally, the branched polyamine, in which m is 3, is commercially available from Tokyo Kasei Organic Chemicals, Japan.

The product of reductive amination is represented by the formula (V) or (VI) shown below:

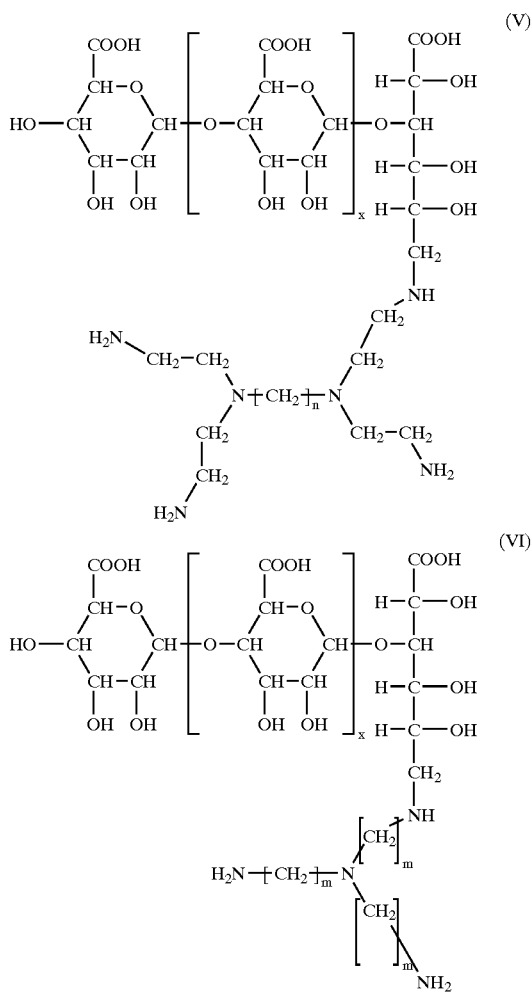

As is well known for polysaccharides, there is a unique aldehyde group on the reducing terminus which exists in solution predominantly as a cyclic hemiacetal. Reductive amination of this unique aldehyde group results in ring opening of the cyclic hemiacetal. By using an excess of the branched polyamine in the reductive amination reaction, only one of the four primary amines of the branched polyamine becomes covalently attached to the polysaccharide, as shown above.

The reductive amination of the compound of the formula (II) with the compound of the formula (III) or (IV) is conveniently and selectively carried out using borohydride or cyanoborohydride salts in aqueous or alcoholic aqueous solutions. Typically used borohydride salts include sodium borohydride, potassium borohydride, lithium borohydride, tetramethylammonium borohydride, and tetrabutylammonium borohydride. Typically used cyanoborohydride salts include sodium cyanoborohydride, potassium cyanoborohydride, lithium cyanoborohydride, and tetrabutylammonium cyanoborohydride. Borohydride salts are in general used at pH values greater than about 7. Cyanoborohydride salts are in general used at pH values as low as about 3. Another convenient and selective method is catalytic hydrogenation using metal catalysts. Typical metal catalysts include any of the Group VIII metals, with nickel, palladium, platinum, and ruthenium being preferred. The metal catalysts may be used in either supported or unsupported forms. Hydrogen pressures are greater than 100 psi, and more preferably greater than 700 psi. Reaction temperatures are in the range of 10° C. to 100° C., and more preferably in the range 30° C. to 70° C. Less selective reagents for reductive amination which may be used include 1) zinc and hydrochloric acid, 2) iron pentacarbonyl and alcoholic potassium hydroxide, and 3) formic acid.

The second reductive amination reaction is carried out using the product of the first reductive amination and an excess of an aldehyde having the general formula: R—CHO where R has the same meaning as $R^1$ and $R^2$. Reductive amination transforms aldehydes, R—CHO, into R—$CH_2$— groups covalently attached to the terminal nitrogens of the branched polyamine. Reductive amination using an excess of aldehyde results in bis-alkylation of three primary amines and mono-alkylation of the secondary amino covalently attached to the polysaccharide. Reductive amination is conveniently and selectively carried out as described above.

Examples of aldehydes R—CHO include the following: benzaldehyde, o-tolualdehyde, m-tolualdehyde, p-tolualdehyde, phenylacetaldehyde, 2-pyridinecarboxaldehyde, 3-pyridinecarboxaldehyde, 4-pyridinecarboxaldehyde, 4-pyridinecarboxaldehyde N-oxide, 6-methyl-2-pyridinecarboxaldehyde, 2-fluorobenzaldehyde, 3-fluorobenzaldehyde, 4-fluorobenzaldehyde, 2-chlorobenzaldehyde, 3-chlorobenzaldehyde, 4-chlorobenzaldehyde, 2-bromobenzaldehyde, 3-bromobenzaldehyde, 4-bromobenzaldehyde, 2-nitrobenzaldehyde, 3-nitrobenzaldehyde, 4-nitrobenzaldehyde, 2-cyanobenzaldehyde, 3-cyanobenzaldehyde, 4-cyanobenzaldehyde, 2-carboxybenzaldehyde, 3-carboxybenzaldehyde, 4-carboxybenzaldehyde, salicylaldehyde, 3-hydroxybenzaldehyde, 4-hydroxybenzaldehyde, 2-formylphenylboronic acid, 3-formylphenylboronic acid, 4-formylphenylboronic acid, 2-formylbenzenesulfonic acid sodium salt, 2-(difluoromethoxy)benzaldehyde, 4-(difluoromethoxy) benzaldehyde, 3-(trifluoromethoxy)benzaldehyde, 4-(trifluoromethoxy)benzaldehyde α, α, α-trifluoro-o-tolualdehyde α, α, α-trifluoro-m-tolualdehyde, α, α, α-trifluoro-p-tolualdehyde, 2,3-dichlorobenzaldehyde, 2,4-dichlorobenzaldehyde, 2,6-dichlorobenzaldehyde, 3,4-dichlorobenzaldehyde, 3,5-dichlorobenzaldehyde, 2,3-difluorobenzaldehyde, 2,4-difluorobenzaldehyde, 2,5-difluorobenzaldehyde, 2,6-difluorobenzaldehyde, 3,4-difluorobenzaldehyde, 3,5-difluorobenzaldehyde, 2-chloro-4-fluorobenzaldehyde, 2-chloro-6-fluorobenzaldehyde, 3-chloro-4-fluorobenzaldehyde, 3-bromo-4-fluorobenzaldehyde, 4-bromo-2-fluorobenzaldehyde, 2-hydroxy-5-nitrobenzaldehyde, 3-hydroxy-4-nitrobenzaldehyde, 4-hydroxy-3-nitrobenzaldehyde, 5-hydroxy-2-nitrobenzaldehyde, 2,3-dihydroxybenzaldehyde, 2,4-dihydroxybenzaldehyde, 2,5-dihydroxybenzaldehyde, 3,4-dihydroxybenzaldehyde, 3,5-dihydroxybenzaldehyde, 2-chloro-5-nitrobenzaldehyde, 2-chloro-6-nitrobenzaldehyde, 4-chloro-3-nitrobenzaldehyde, 5-chloro-2-nitrobenzaldehyde, 2-fluoro-5-nitrobenzaldehyde, 2,4-dinitrobenzaldehyde, 2,6-dinitrobenzaldehyde, 3,5-dinitrobenzaldehyde, 5-bromosalicylaldehyde, 5-chlorosalicylaldehyde, 3-fluorosalicylaldehyde, 4-formyl-1,3-benzenedisulfonic acid disodium salt, 2-fluoro-3-(trifluoromethyl) benzaldehyde, 2-fluoro-6-(trifluoromethyl)benzaldehyde, 4-fluoro-2-(trifluoromethyl)benzaldehyde, 4-fluoro-3-(trifluoromethyl)benzaldehyde, phthalaldehyde, isophthalaldehyde, terephthalaldehyde, piperonal, 2,3-(methylenedioxy)benzaldehyde, o-anisaldehyde, m-anisaldehyde, p-anisaldehyde, vanillin, o-vanillin, 2-hydroxy-4-methoxybenzaldehyde, 2-hydroxy-5-methoxybenzaldehyde, 3-hydroxy-4-methoxybenzaldehyde, 3-methoxy-5-nitrosalicylaldehyde, 5-nitro-vanillin, 5-iodovanillin, 3-fluoro-p-anisaldehyde, 2-bromo-3-hydroxy-4-methoxybenzaldehyde, 5-bromo-2-hydroxy-3-methoxybenzaldehyde, 5-bromovanillin, 3-fluoro-2-methlbenzaldehyde, 3-bromo-p-anisaldehyde, 5-bromo-o-anisaldehyde, 5-(trifluoromethoxy) salicylaldehyde, 5-bromo-3-nitrosalicylaldehyde, 3,5-dibromosalicylaldehyde, 3,5-dibromo-4-hydroxybenzaldehyde, 3,5-dichlorosalicylaldehyde, 3,5-diiodosalicylaldehyde, 3,4-dihydroxy-5-methoxybenzaldehyde, 2,5-bis(trifluoromethyl) benzaldehyde, 3,5-bis(trifluoromethyl)benzaldehyde, cinnamaldehyde, α-bromocinnamaldehyde, α-chlorocinnamaldehyde, 2-nitrocinnamaldehyde, 4-nitrocinnamaldehyde, vinylbenzaldehyde, 4-acetoxybenzaldehyde, 2-hydroxy-5-methyl-1,3-benzenedicarboxaldehyde, 2,3-dimethoxybenzaldehyde, 2,4-dimethoxybenzaldehyde, 2,5-dimethoxybenzaldehyde, 2,6-dimethoxybenzaldehyde, veratraldehyde, 3,5-dimethoxybenzaldehyde, 5-bromo-2,4-dimethoxybenzaldehyde, 5-bromoveratraldehyde, 6-bromoveratraldehyde, 4-acetamidobenzaldehyde, 6-nitroveratraldehyde, 2,4-dimethylbenzaldehyde, 2,5-dimethylbenzaldehyde, 4-ethylbenzaldehyde, hydrocinnamaldehyde, 2-phenylpropionaldehyde, benzyloxyacetaldehyde, 3,5-dimethylhydroxylbezaldehyde, 2-ethoxybenzaldehyde, 4-ethoxybenzaldehyde, 3-methyl-p-anisaldehyde, 3-ethoxy-4-hydroxybenzaldehyde, 3-ethoxysalicylaldehyde, 2,6-dimethoxy-4-hydroxybenzaldehyde, 3,4-dimethoxy-5-hydroxybenzaldehyde, 4,6-dimethoxysalicylaldehyde, syringaldeyde, 2,3,5-trichlorobenzaldehyde, 2,3,6-trichlorobenzaldehyde, 2,3,4-trifluorobenzaldehyde, 2,3,6-trifluorobenzaldehyde, 2,3,4-trihydroxybenzaldehyde, 2,4, 6-trihydroxybenzaldehyde, 3,4,5-trihydroxybenzaldehyde, 2,3,5,6-tetrafluorobenzaldehyde, pentafluorobenzaldehyde, 2-quinolinecarboxaldehyde, 3-quinolinecarboxaldehyde, 4-quinolinecarboxaldehyde, 2-allyloxybenzaldehyde, 2-methoxycinnamaldehyde, vanillin acetate, 4-isopropylbenzaldehyde, mesitaldehyde, 3-phenylbutyraldehyde, 2,3-dimethyl-p-anisaldehyde, 2,5-dimethyl-p-anisaldehyde, 4-propoxybenzaldehyde, 2,4-dimethoxy-3-methylbenzaldehyde, 3-ethoxy-4-methoxybenzaldehyde, 2,3,4-trimethoxybenzaldehyde, 2,4, 5-trimethoxybenzaldehyde, 2,4,6-trimethoxybenzaldehyde, 3,4,5-trimethoxybenzaldehyde, 1-naphthaldehyde, 2-naphthaldehyde, 2-hydroxy-1-naphthaldehyde, 4-acetoxy-3,5-dimethoxybenzaldehyde, methyl 2-formyl-3,5-dimethoxybenzoate, 4-(dimethylamino)cinnamaldehyde, 4-tert-butylbenzaldehyde, 4-butoxybenzaldehyde, 3-tert-butyl-2-hydroxybenzaldehyde, 5-tert-butyl-2-hydroxybenzaldehyde, 4-(dimethylamino)benzaldehyde, 4-(diethylamino)benzaldehyde, 4-(diethylamino) salicylaldehyde, 2,3-naphthalendicarboxaldehyde, 1,8-naphthalaldehydic acid, 2-methoxy-1-naphthalaldehyde, 4-methoxy-1-naphthalaldehyde, 4-acetoxy-3-methoxycinnamaldehyde, pentamethylbenzaldehyde, 4-biphenylcarboxaldehyde, 3-phenoxybenzaldehyde, 4-phenoxybenzaldehyde, phenylpropargyl aldehyde, 4-(diethylamino)cinnamaldehyde, 4-(hexyloxy)benzaldehyde, 2-fluorenecarboxaldehyde, diphenylacetaldehyde, 3-benzyloxybenzaldehyde, 4-benzyloxybenzaldehyde, 3-(4-methoxyphenoxy)benzaldehyde, phthalimidoacetaldehyde, α-amylcinnamaldehyde, 9-anthraldehyde, 2-benzyloxy-3-methoxybenzaldehyde, 3-benzyloxy-4-methoxybenzaldehyde, 4-benzyloxy-3-methoxybenzaldehyde, α-hexylcinnamaldehyde, 3,5-di-tert-butyl-2-hydroxybenzaldehyde, and 3,5-di-tert-butyl-4-hydroxybenzaldehyde.

According to the preferred embodiment of the present invention, the compound of the formula (i) wherein $R^1 \ne R^2$ in the group of the formula (i) and (ii) may be obtained using three reductive amination reactions using aldehydes.

The first reductive amination reaction is carried out using the tetrakis or tris Schiff base product of the reaction between the branched polyamine of the formula (III) or (IV) and four or three equivalents of an aldehyde: R—CHO wherein R is $R^1$.

The tetrakis or tris Schiff base product of the reaction so is represented by the formula (VII) or (VIII) shown below:

(VII)

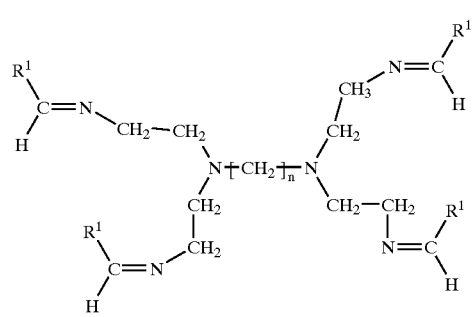

(VIII)

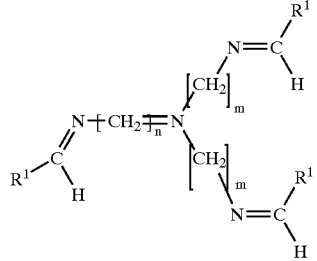

(wherein n is in the range from 2 to 12 and m is either 2 or 3.)

The above Schiff base products may be prepared by heating the polyamine and aldehyde with stirring in a solvent in which the starting materials and product are soluble. For some Schiff base products, it may be necessary to remove water azeotropically by distillation or by using a drying agent, such as a molecular sieve.

The first reductive amination reaction using the tetrakis or tris Schiff base product yields the substituted polyamine of the formula (IX) or (X) shown below;

(IX)

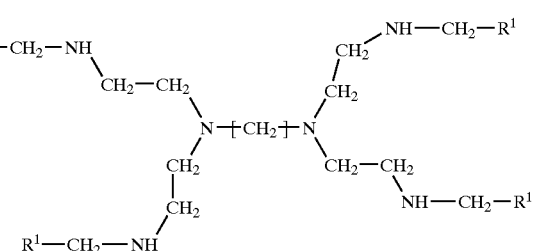

(X)

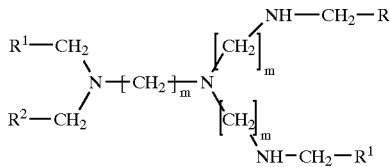

(wherein n is in the range from 2 to 12 and m is either 2 or 3.)

Reductive amination is conveniently and selectively carried out using borohydride or cyanoborohydride salts in aqueous or alcoholic aqueous solutions. Typically used borohydride salts include sodium borohydride, potassium borohydride, lithium borohydride, tetramethylammonium borohydride, and tetrabutylammonium borohydride. Typically used cyanoborohydride salts include sodium cyanoborohydride, potassium cyanoborohydride, lithium cyanoborohydride, and tetrabutylammonium cyanoborohydride. Borohydride salts are in general used at pH value greater than about 7. Cyanoborohydride salts are in general used at pH values as low as about 3. Another convenient and selective method is catalytic hydrogenation using metal catalysts. Typical metal catalysts include any of the Group VIII metals, with nickel, palladium, platinum, and ruthenium being preferred. The metal catalysts may be used in either supported or unsupported forms. Hydrogen pressures greater than 100 psi, and more preferably greater than 700 psi are preferred. Reaction temperatures in the range of 10° C. to 100° C., and more preferably in the range 30° C. to 70° C., are preferred. Less selective reagents for reductive amination which may be used include 1) zinc and hydrochloric acid, 2) iron pentacarbonyl and alcoholic potassium hydroxide, and 3) formic acid.

It is not necessary to isolate and/or purify the tetrakis or tris Schiff base prior to the first reductive amination reaction. Thus, after formation of the Schiff base in solution, the reductive amination may be implemented by adding the appropriate reducing reagent(s).

The second reductive amination reaction is carried out using one equivalent of the polyamine represented by the formula (IX) or (X) and three or two equivalents of an aldehyde: R—CHO where R is $R^2$.

The second reductive amination reaction yields the substituted polyamine shown below:

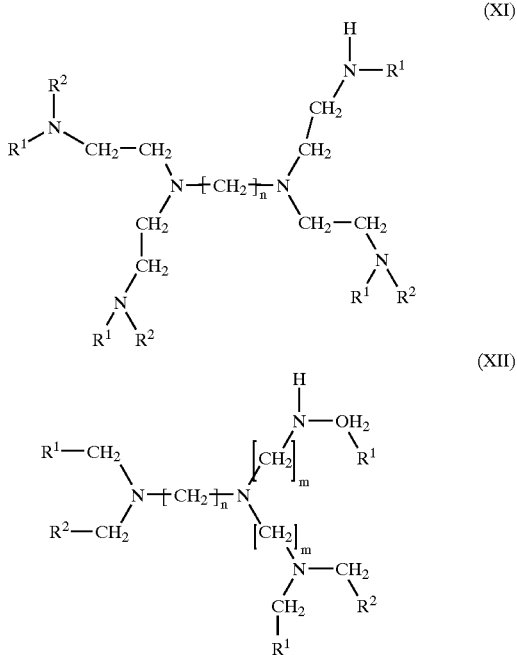

(wherein n is in the range from 2 to 12 and m is either 2 or 3).

Reductive amination is conveniently and selectively carried out as described above.

The third reductive amination reaction is carried out using the substituted polyamine of the formula (XI) or (XII) and the polysaccharide compound of the formula (II) to give the compound of the formula (I).

As is well known for polysaccharides, there is a unique aldehyde group on the reducing terminus which exists in solution predominantly as a cyclic hemiacetal. Reductive amination of this unique aldehyde group results in ring opening of the cyclic hemiacetal.

Water

Water is the principal solvent for the ink compositions of the present invention. Deionized water is preferable. The amount of aqueous carrier medium in the ink composition of the present invention, i.e., water, the humectant(s), the penetrating solvent(s), the surfactants (s), and any water soluble additives such as those described below, is preferably 70 to 99.8% by weight.

Humectants

The ink composition of the present invention may contain at least one cosolvent which may be classified as a humectant in the art. The humectants have high affinities for water and relatively high boiling points. Examples of the humectant include glycerol, glycerol ethoxylate, diethylene glycol, triethylene glycol, and tetraethylene glycol. While no particular limitation is imposed on the total amount of the humectant to be used in the ink, it is preferably present in a range of about 0.5 to 25% by weight.

Penetrating Cosolvents

The ink composition of the present invention may contain at least one cosolvent which may be classified as a penetrating cosolvent in the art. The penetrating cosolvents facilitate rapid penetration of an ink composition into the interior of a porous print medium. According to the preferred embodiment of the present invention, the cosolvent has separate hydrophobic and hydrophilic parts. Examples of the penetrating cosolvent include diethylene glycol mono-n-butyl ether, triethylene glycol mono-n-butyl ether, 1,2-pentanediol, and 1,2-hexanediol. While no particular limitation is imposed on the total amount of penetrating cosolvent to be used in the ink, it is preferably present in a range or about 0.5 to 15% by weight.

Surfactants

The ink composition of the present invention may contain at least one surfactant. The surfactants may be selected from the group consisting of anionic or non-ionic surfactants. Examples of the surfactant include an acetylenic diol and an ethylene oxide adduct of an acetylenic diol. Surfactants of this type are available from Air Products and Chemicals, Inc.; Allentown, Pa., 18195; USA. While no particular limitation is imposed on the total amount of surfactant to be used in the ink, it is preferably present in a range of 0.05 to 5% by weight.

Pigment

The pigment of the present invention may contain at least one selected from the group consisting organic or inorganic pigments. The term "pigment" as used herein means an insoluble colorant.

The pigment particles are sufficiently small to permit free flow of the pigment dispersed ink through the ink jet printing device, especially through the ejecting nozzles which typically have a diameter ranging from 10 to 50 microns. Preferably the average particle size of dispersed pigment in the ink composition of the present invention is in the range of approximately 20 to 150 nanometers.

The selected pigment may be used in dry or wet form. Usually pigments are manufactured in aqueous media and the resulting pigment is obtained as a water wet presscake. In this presscake form, the pigment is not agglomerated to the extent that it is in a dry form. Pigments in wet presscake form do not require as much deflocculation in the process of preparing pigment dispersions as do dry pigments.

Examples of the pigments include the following: Symuler Fast Yellow GF (Dainippon Ink; C.I. Pigment Yellow 12), Symuler Fast Yellow GRF (Dainippon Ink; C.I. Pigment Yellow 13), Symuler Fast Yellow 5GF (Dainippon Ink; C.I. Pigment Yellow 14), Irgalite Yellow CG (Ciba-Geigy; C.I. Pigment Yellow 16), Symuler Past Yellow HGF (Dainippon Ink; C.I. Pigment Yellow 17), Symuler Fast Yellow 4117 (Dainippon Ink; C.I. Pigment Yellow 73), Symuler Fast Yellow 4191N (Dainippon Ink; C.I. Pigment Yellow 74), Symuler Fast Yellow 4181 (Dainippon Ink; C.I. Pigment Yellow 83), Chromophthal Yellow 3G (Ciba-Geigy; C.I. Pigment Yellow 93), Chromophthal Yellow GR (Ciba-Geigy; C.I. Pigment Yellow 95), Symuler Fast Yellow 4186 (Dainippon Ink; C.I. Pigment Yellow 97), Hansa Brilliant Yellow 10GX (Hoechst Celanese; C.I. Pigment Yellow 98), Permanent Yellow G3R-01 (Hoechst Celanese; C.I. Pigment Yellow 114), Chromophthal Yellow 8G (Ciba-Geigy; C.I. Pigment Yellow 128), Irgazin Yellow 5GT (Ciba-Geigy; C.I. Pigment Yellow 129), Hostaperm Yellow H4G (Hoechst Celanese; C.I. Pigment Yellow 151), Symuler Fast Yellow 4192 (Dainippon Ink; C.I. Pigment Yellow 154), Toner Yellow HG (Clariant; C.I. Pigment Yellow 180), Hostaperm Orange GR (Hoechst Celanese; C.I. Pigment Orange 43), Paliogen Orange (BASF; C.I. Pigment Orange 51), Symuler Brilliant Carmine (Dainippon Ink; C.I. Pigment Red 57:1), Fastogen Super Magenta: (Dainippon Ink; C.I. Pigment Red 122), Toner Magenta E02 (Clariant; C.I. Pigment Red 122), Paliogen Red L3870 (BASF; C.I, Pigment Red 123), Hostaperm Scarlet GO (Hoechst Celanese; C.I. Pigment Red 168), Permanent Rubine F6B (Hoechst Celanese; C.I. Pigment Red 184), Monastral Magenta (Ciba-Geigy; C.I. Pigment Red 202), Monastral Scarlet (Ciba-Geigy; C.I. Pigment Red 207) Fastogen Blue GP-100 (Dainippon Ink, C.I. Pigment Blue 15:2), Fastogen Blue GNPR (Dainippon Ink, C.I. Pigment Blue 15:3), Toner Cyan BG (Clariant; C.I. Pigment Blue 15:3), Fastogen Blue GNPS (Dainippon Ink; C.I. Pigment Blue 15:4), Micracet Blue R (Ciba-Geigy; C.I. Pigment Blue 60), Fastogen Green S (Dainippon Ink; C.I. Pigment Green 7), Fastogen Green 2YK (Dainippon Ink; C.I. Pigment Green 36), Fastogen Super Red (Dainippon Ink; C.I. Pigment Violet 19), Fastogen Super Violet (Dainippon Ink; C.I. Pigment Violet 23), Monastral Maroon RT-229-D (Ciba-Geigy; C.I. Pigment Violet 42), Raven 1170 (Columbian Chemicals; C.I. Pigment Black 7), Black FW 18 (Degussa; C.I. Pigment Black 7), and Special Black 4A (Degussa; C.I. Pigment Black 7).

The amount of pigment in the ink composition of the present invention is preferably about 0.1 to 10% pigment by weight.

Neutralizing Agent

To solubilize the polysaccharide portion of the compound of the formula (I) in the aqueous carrier medium, it may be necessary to neutralize some or all of the carboxylic acid functions. Neutralizing agents which are suitable for this purpose include organic bases, alkanolamines, alkali metal hydroxides, and mixtures thereof. Examples of suitable neutralizing agents include the following: methylamine, dimethylamine, trimethylamine, morpholine, N-methylmorpholine, monoethanolamine, diethanolamine, triethanolamine, N-methyl-monoethanolamine, N,N-dimethyl-monoethanolamine, N-methyl-diethanolamine, tetramethylammonium hydroxide, ammonia, lithium hydroxide, sodium hydroxide, potassium hydroxide, rubidium hydroxide, and cesium hydroxide. The preferred neutralizing agent is lithium hydroxide. While no particular limitation is imposed on the total amount of neutralizing agent added to the ink of the present invention, the amount should be chosen such that the pH of the ink composition is in the range of about 4 to 10.

Other Components

In addition to the above described components, the ink composition of the present invention may contain, optionally, one or more components in addition to the above described principal components. Examples may include the following water soluble organic solvents: (1) alcohols such as isopropyl alcohol, butyl alcohols, etc. (2) ketones such as acetone, methyl ethyl ketone, etc. (3) ethers such as tetrahydrofuran, dioxane, etc. (4) esters such as ethyl acetate, propylene carbonate, etc. (5) nitrogen containing compounds such as urea pyrrolidone, N-methyl-2-pyrrolidone, etc. (6) sulfur containing compounds such as dimethylsulfoxide, tetramethylene sulfoxide, etc. Additionally, the inks may contain, optionally, additives such as pH buffers, biocides, viscosity modifiers, ultraviolet ray absorbers, and antioxidants. While no particular limitation is imposed on the total amount of other components to be used in the ink, the amounts of all components of the ink are selected such that the surface tension of the ink is preferably in the range of approximately 30 to 40 dyne/cm and the viscosity of the ink is in the range of approximately 1.0 to 10.0 mPas.

Ink Preparation

The ink composition of the present invention may be prepared in one step by dispersing and mixing the above described components using any acceptable method. Alternatively, the ink compositions may be prepared in two steps by 1) dispersing and mixing some of the above described components and then 2) adding the remaining components to the dispersion and mixing. The dispersing step may be accomplished using a ball mill, a sand mill, an atrittor, a roll mill, an agitator mill, a Henschel mixer, a colloid mill, an ultrasonic homogenizer, a jet mill, a minimill or an angmill to obtain a homogeneous dispersion.

According to the preferred embodiment of the present invention, the ink composition may be prepared by providing first the pigmented ink in a concentrated form and then subsequently diluting the concentrated dispersion to a concentration appropriate for use in the ink jet printer. Also, it is generally desirable to filter the pigment dispersed aqueous ink composition, preferably using a metal mesh filter or a membrane filter. Filtration may be accomplished by applying pressure to the ink composition being filtered or by reducing the pressure on the receiving end of the filtration device. Centrifugal separation may also be used to remove large particles which may cause obstruction of the nozzles on the printhead of the ink jet printer.

EXAMPLES

Preparation of Dispersant

All operations were carried out in a well ventilated draft hood.

POLYSACCHARIDE 11 (the compound of the formula (II) where x=11)

150 g of alginic acid (Ultra Low Viscosity Alginic Acid; Kibun Food Chemiphar; Japan) was slurried in 600 mL of deionized water in a 2000 mL beaker. To this slurry was added 28 g of lithium hydroxide monohydrate, while stirring the slurry with an overhead mechanical stirrer. The alginic acid dissolved to yield a solution with a pH value of approximately 4.2. Deionized water was added to give a total solution volume of 700 mL. Next, 100 g of 34.5 wt. % hydrogen peroxide solution and 2 mL of n-octyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. Next, the mixture was heated just to boiling and then filtered hot through a sheet of #1 Whatman filter paper. 6N hydrochloric acid was added gradually to the filtrate with stirring until the pH of the resulting mixture reached a value of 2.5, as was determined using Microfine pH test paper having a range of 1.3 to 4.4. The solid which precipitated was collected by vacuum filtration using a fine porosity (pore size: 16–40 microns) fritted glass filter. The wet solid was transferred to a 1 L beaker along with approximately 250 mL of deionized water. While stirring the slurry, 500 mL of 95% ethanol was added gradually with stirring. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 17 g. The procedure was repeated 11 times to prepare a total amount of approximately 200 g. The average degree of polymerization of the polysaccharide was determined using the method of P. A. Shaffer and M. Somogyi (J. Biol. Chem., 100, 695–713 (1933)). Galacturonic acid monohydrate, which was recrystallized from ethanol and water, was used as the reference simple sugar for this method. The measured average degree of polymerization of the polysaccharide sample was 13. In the formula (II), an average degree of polymerization corresponds to a value of x equal to 11.

POLYSACCHARIDE 6 (the compound of the formula (II) where x=6)

150 g of alginic acid (Ultra Low Viscosity Alginic Acid; Kibun Food Chemiphar; Japan) was slurried in 500 mL of deionized water in a 2000 mL beaker. To this slurry was added 28 g of lithium hydroxide monohydrate, while stirring the slurry with an overhead mechanical stirrer. Deionized water was added to give a total solution volume of 600 mL. 100 g of 34.5 wt. % hydrogen peroxide solution and was added and the resulting solution was stirred for 4 hours and then set aside to stand for 16 hours. Next, 2 mL of n-octyl alcohol, as a defoaming agent, and a freshly prepared 40 mL solution containing 0.65 g of ferrous sulfate heptahydrate were added to the alginic-acid/hydrogen peroxide solution with stirring. The solution was stirred vigorously for four hours during which time a substantial exotherm occurred and then subsided. 40 g of 34.5 wt. % hydrogen peroxide solution was added and the resulting solution was stirred briefly and then set aside to stand for 16 hours. Next, the mixture was heated at 50° C. until a mild exotherm occurred and subsided and the color of the solution darkened noticeably. The darkened solution was allowed to cool to ambient temperature and then filtered through a sheet of #1 Whatman filter paper. 55 mL of 12N hydrochloric acid was added gradually with stirring to the filtrate which resulted in the precipitation of a small amount of solid. The mixture was stirred for 4 hours and then filtered through a sheet of #5 Whatman filter paper. The filtrate was transferred to a pear-shaped flask and concentrated to approximately 175 g using a rotary evaporator with a water bath temperature of slightly less than 50° C. 400 mL of methanol was added to the concentrated solution and the combined solution was transferred to a 3 L beaker containing a magnetic stir bar. While stirring the solution, 95% ethanol was added slowly until the total volume of the mixture reached 3 L. A flocculent white precipitate formed during the addition of ethanol. The beaker was covered and set aside to stand for 16 hours. Most of the supernatant was decanted and the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 12 g. The procedure was repeated 16 times to prepare a total amount of approximately 200 g. The average degree of polymerization of the polysaccharide was determined using the method of P. A. Shaffer and M. Somogyi (J. Biol. Chem., 100, 695–713 (1933)). Galacturonic acid monohydrate, which was recrystallized from ethanol and water, was used as the reference simple sugar for this method. The measured average degree of polymerization of the polysaccharide sample was 8. In the above formula an average degree of polymerization corresponds to a value of x equal to 6.

POLYAMINE Am4 (the compound of the formula (III) where n=4)

The branched polyamine starting material, Am4, was obtained as "Astramol Am4" from DSM New Business Development, The Netherlands.

POLYAMINE Am6 the compound of the formula (III) where n=6)

The branched polyamine starting materials Am6, was prepared from hexamethylenediamine using the method described in de Brabander-van den Berg, R. M. M., Meijer, E. W. Angew. Chem. Int. Ed. Engl. Vol. 32, No. 9, pp. 1308–1311 (1993).

POLYSACCHARIDE 11+POLYAMINE Am4 (the compound of the formula (V) where x=11 and n=4)

200 g of Polysaccharide 11 and 100 of Polyamine Am4 g were dissolved in 600 mL of deionized water contained in a 5 L beaker with stirring. An additional 100 g of Polyamine Am4 was added to the solution with stirring. Next, the pH of the combined solution was adjusted to 8.90 by dropwise addition of 12 N hydrochloric acid solution with vigorous stirring. After deionized water was added to bring the total volume of the solution up to 1200 mL the solution was set aside to stand at ambient temperature for 15 days. While stirring the solution vigorously, 50 g of sodium cyanoborohydride was added to the solution. The solution was stirred for 8 hours and then set aside to stand at ambient temperature for 4 days. While stirring the solution vigorously, the pH of the combined solution was adjusted to 2 by dropwise addition of 12 N hydrochloric acid solution. Next, 2 L of methanol was added with vigorous stirring. The product separated as an off-white solid from which the supernatant solution was decanted and discarded. The wet solid was washed with several portions of methanol and then collected by vacuum filtration. The solid was air dried and then dried under vacuum. The weight of dried solid was about 220 g.

POLYSACCHARIDE 11+POLYAMINE Am6 (the compound of the formula (V) where x=11 and n=6)

This compound was prepared by an analogous method to that described above for Polysaccharide 11+Polyamine Am4, with the exception that Polyamine Am6 was used.

POLYSACCHARIDE 6+POLYAMINE Am4 (the compound of the formula (V) where x=6 and n=4)

200 g of Polysaccharide 6 and 100 of polyamine Am4 g were dissolved in 600 mL of deionized water contained in a 2 L beaker with stirring. An additional 100 g of Polyamine Am4 was added to the solution with stirring. Next, the pH of the combined solution was adjusted to 8.70 by dropwise addition of 12 N hydrochloric acid solution with vigorous stirring. The solution was set aside to stand at ambient temperature for 15 days. While stirring the solution vigorously, 50 g of sodium cyanoborohydride was added to the solution. The solution was stirred for 8 hours and then set aside to stand at ambient temperature for 4 days. Next the solution was transferred to a pear-shaped flask and most of the water was removed by evaporation using a rotary evaporator with a water bath temperature of slightly less than 50° C. The oily solid was transferred to a 2 L beaker and washed with several portions of methanol, with the methanol washings being discarded. The solid was air dried and then dried under vacuum. The weight of dried solid was about 230 g.

POLYSACCHARIDE 6+POLYAMINE Am6 (the compound of the formula (V) where x=6 and n=6)

This compound was prepared by an analogous method to that described above for Polysaccharide 6+Polyamine Am4, with the exception that Polyamine Am6 was used.

DISPERSANT A1 (the compound of the formula (I) where x=11, n=4, A=group (i), and $R^1=R^2=3,4$-methylenedioxyphenyl)

100 g of [Polysaccharide 11+Polyamine Am4] obtained above and 600 mL of deionized water were added to a 5 L beaker and then stirred with an overhead mechanical stirrer.

To the resulting slurry were added 200 g of piperonal and 16 g of lithium hydroxide monohydrate. After stirring for several hours an emulsion formed. While stirring the mixture vigorously, 250 mL of a methanolic solution of tetraethylammonium cyanoborohydride, which was prepared by metathesis of 25 g of 95% sodium cyanoborohydride with 75 g of tetraethylammonium chloride in methanol, was added. The mixture was stirred for 8 hours and then set aside for 16 hours. The pH of the mixture was adjusted to 7.5 by the dropwise addition of 3 N hydrochloric acid solution and an additional 250 mL of a methanolic solution of tetraethylammonium cyanoborohydride, prepared exactly as above, was added. The mixture was stirred for 8 hours and then set aside for 16 hours. The pH of the mixture was adjusted to 6.0 by the dropwise addition of 3 N hydrochloric acid solution and stirred for an additional 8 hours. Next, the pH of the mixture was adjusted to 2.0 by the dropwise addition of 3 N hydrochloric acid solution while stirring vigorously. The mixture was set aside for 40 hours during which time a solid precipitated. The supernatant was decanted off from the solid and discarded. Next, 500 mL of N-methylpyrrolidinone and 100 g of piperonal were added to the solid. While stirring and warming the mixture at 45° C., the solid slowly dissolved. To the resulting solution was added 250 mL of a methanolic solution of tetraethylammonium cyanoborohydride, prepared exactly as above. The solution was stirred for 8 hours and then set aside for 16 hours. The pH of the mixture was adjusted to 5.5 by the dropwise addition of 3 N hydrochloric acid solution and an additional 250 mL of a methanolic solution of tetraethylammonium cyanoborohydride, prepared exactly as above, was added. The solution was stirred for 48 hours and then the pH was adjusted to 2.0 by the dropwise addition of 3 N hydrochloric acid solution while stirring vigorously. Isopropanol was added with stirring until the volume of the mixture reached a total of 5 L. A flocculent off-white precipitate formed during the addition of isopropanol. The beaker was covered and set aside to stand for 40 hours. Most of the supernatant was decanted and the solid was isolated from the remaining mixture by centrifuging in 100 mL centrifuge tubes at 3000 rpm for 30 minutes. The separated solids were combined in a 2 L beaker and washed with several portions of 95% ethanol and then collected by vacuum filtration using a fine porosity (pore size: 16–40 microns) fritted glass filter. The solid was air-dried to a constant weight. The yield of product was about 120 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 6.5. While monitoring the pH of the mixture, an aqueous solution of lithium hydroxide monohydrate (5 wt. %) was added dropwise with stirring until the pH reached a constant value of 7.9. Additional water was added such that a total solution weight of 200 g was obtained. For the final step, the resulting solution was filtered through a 10 micrometer teflon membrane filter.

DISPERSANT B1 (the compound of the formula (I) where x=11, n=6, A=group (i), and $R^1=R^2$=4-isopropylphenyl)

This compound was prepared by an analogous method to that described above for Dispersant A, with the exception that [Polysaccharide 11+Polyamine Am6] obtained above and 4-isopropylbenzaldehyde were used. A 200 g solution containing 30 g of Dispersant B1 was prepared as described above for Dispersant A1.

DISPERSANT C1 (the compound of the formula (I) where x=6, n=4, A=group (i), and $R^1=R^2$=3-Pyridyl)

This compound was prepared by an analogous method to that described above for Dispersant A, with the exception that [Polysaccharide 6+Polyamine Am4] obtained above and 3-pyridinecarboxaldehyde were used. A 200 g solution containing 30 g of Dispersant C1 was prepared as described above for Dispersant A1.

DISPERSANT D1 (the compound of the formula (I) where x=6, n=6, A=group (i), and $R^1=R^2$=4-carboxyphenyl)

This compound was prepared by an analogous method to that described above for Dispersant A, with the exception that [Polysaccharide 6+Polyamine Am6] obtained above and 4-carboxybenzaldehyde were used. A 200 g solution containing 30 g of Dispersant D1 was prepared as described above for Dispersant A1.

SUBSTITUTED POLYAMINE Am4a (the compound of the formula (XI) where n=4, $R^1$=1-naphthyl, and $R^2$=3-nitrophenyl 20 g of Polyamine Am4 (Astramol Am4 from DSM New Business Development; The Netherlands) and 42 g of 1-naphthaldehyde were dissolved in 800 mL of 2-butanol contained in a 1 L beaker with stirring. The solution was stirred for one hour and then heated to boiling. The alcohol solvent was boiled off until approximately 400 mL of solvent remained. The solution was allowed to cool to ambient temperature and then placed in a minus 20° C. freezer overnight. On standing overnight the tetrakis Schiff base product had separated from the solution. The alcohol supernatant was decanted from the solid and then 200 g of dimethylsulfoxide and 400 g of methanol were added. While stirring the mixture vigorously, 10 g of sodium borohydride was added. After stirring the mixture for 2 hours a homogeneous solution was obtained. The solution was heated to boiling for 1 hour to destroy any residual unreacted sodium borohydride. After cooling the solution to ambient temperature, a freshly prepared solution of 28.7 g of 3-nitrobenzaldehyde in 200 g or dimethylsulfoxide was added with stirring. The combined solution was stirred at ambient temperature for 2 hours. Next, the solution was heated to 80° C. and held at that temperature for 2 hours. The solution was allowed to cool to ambient temperature and then 100 g of methanol and 8 g of sodium borohydride were added with stirring. The solution was stirred at ambient temperature for 4 hours and then heated to boiling for 3 hours to boil off the methanol and to destroy residual unreacted sodium borohydride. The substituted polyamine product was not isolated, but instead was used as a solution in dimethylsulfoxide in the preparations of Dispersant E1 and Dispersant F1 described below.

SUBSTITUTED POLYAMINE Am4b (the compound of the formula (XI) where n=4, $R^1$=3,4-methylenedioxyphenyl, and $R^2$=phenyl 20g of Polyamine Am4 (Astramol Am4 from DSM New Business Development; The Netherlands) and 38.4 g of piperonal were dissolved in 800 mL of 2-butanol contained in a 1 L beaker with stirring. The solution was stirred for one hour and then heated to boiling. The alcohol solvent was boiled off until approximately 400 mL of solvent remained. The solution was allowed to cool to ambient temperature and then placed in a minus 20° C. freezer overnight. On standing overnight, the tetrakis Schiff base product had separated from the solution. The alcohol supernatant was decanted from the solid and then 200 g of dimethylsulfoxide and 400 g of methanol were added. While stirring the mixture vigorously, 10 g of sodium borohydride was added. After stirring the mixture for 2 hours, a homogeneous solution was obtained. The solution was heated to boiling for 1 hour to destroy any residual unreacted sodium borohydride. After cooling the solution to ambient temperature, a freshly prepared solution of 20.1 g of benzaldehyde in 200 g of dimethylsulfoxide was added with stirring. The combined solution was stirred at ambient temperature for 2 hours. Next, the solution was heated to 80° C. and held at that temperature for 2 hours. The solution was allowed to cool to ambient temperature and then 100 g of methanol and 0 g of sodium borohydride were added with stirring. The solution was stirred at ambient temperature for 4 hours and then heated to boiling for 3 hours to boil off the methanol and to destroy residual unreacted sodium borohydride. The substituted polyamine product was not isolated, but instead was used as a solution in dimethylsulfoxide in the preparations of Dispersant G1 and Dispersant H1 described below.

DISPERSANT E1 (the compound of the formula (I) where x=11, n=4, A=group (i), $R^1$=1-naphthyl, and $R^2$=3-nitrophenyl)

70g of Polysaccharide 11, 40 g of trifluoroacetic acid, and 350 g of dimethylsulfoxide were added to a 1 L wide-mouthed polyethylene bottle. The bottle was capped and transferred to a 40° C. water bath. After warming for several hours, substantially all of the polysaccharide dissolved. Next, the bottle was removed from the water bath and opened. A dimethylsulfoxide solution (approximately 400 mL) of Substituted Polyamine Am4a was added to the polysaccharide solution. Immediately on mixing a gel formed. The gel was broken up using a small hand mixer for about 10 minutes. The mouth of the polyethylene bottle was wrapped with Teflon tape and the bottle was sealed. The bottle was loaded into a 60° C. constant temperature oven for 7 days. Next, the bottle was opened and the contents transferred to a 2 L beaker equipped with a magnetic stir bar. While stirring the mixture vigorously, 320 mL of a methanolic solution of tetraethylammonium cyanoborohydride, which was prepared by metathesis of 40 g of 95% sodium cyanoborohydride with 115 g of tetraethylammonium chloride in methanol, was added. The mixture was stirred for 1 hour and then trifluoroacetic acid was added until all of the solids just dissolved (approximately 50 g). The resulting solution was stirred for an additional 24 hours. The solution was transferred to a 5 L beaker equipped with an overhead mechanical stirrer. While stirring the solution vigorously, isopropanol was added until the volume of the mixture reached a total of 5 L. A flocculent off-white precipitate formed during the addition of isopropanol. The beaker was covered and set aside to stand for 40 hours. Most of the supernatant was decanted and the solid was isolated from the remaining mixture by centrifuging in 100 mL centrifuge tubes at 3000 rpm for 30 minutes. The separated solids were combined in a 2 L beaker and washed with several portions of 95% methanol and then collected by vacuum filtration using a fine porosity (pore size: 16–40 microns) fritted glass filter. The solid was air-dried to a constant weight. The yield of product was about 150 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 8.8. While monitoring the pH of the mixture, an aqueous solution of lithium hydroxide monohydrate (5 wt. %) was added dropwise with stirring until the pH reached a constant value of 9.0. Additional water was added such that a total solution weight of 200 g was obtained. For the final step, the resulting solution was filtered through a 10 micrometer Teflon membrane filter.

DISPERSANT F1 (the compound of the formula (I) where x=6, n=4, A=group (i), $R^1$=1-naphthyl, and $R^2$=3-nitrophenyl)

This compound was prepared by an analogous method to that described above for Dispersant E1, with the exception that Polysaccharide 6 was used. A 200 g solution containing 30 g of Dispersant F1 was prepared as described above for Dispersant E1.

DISPERSANT G1 (the compound of the formula (I) where x=11, n=4, A=group (i), $R^1$=3,4-methylenedioxyphenyl, and $R^2$=phenyl)

This compound was prepared by an analogous method to that described above for Dispersant E1, with the exception that a dimethylsulfoxide solution (approximately 400 mL) of Substituted Polyamine Am4b was used. A 200 g solution containing 30 g of Dispersant G1 was prepared as described above for Dispersant E1.

DISPERSANT H1 (the compound of the formula (I) where x=6, n=4, A=group (i), $R^1$=3,4-methylenedioxyphenyl, and $R^2$=phenyl)

This compound was prepared by an analogous method to that described above for Dispersant E1, with the exception that Polysaccharide 6 and a dimethylsulfoxide solution (approximately 400 mL) of Substituted Polyamine AM4b were used. A 200 g solution containing 30 g of Dispersant H1 was prepared as described above for Dispersant E1.

POLYAMINE Am2 (the compound of the formula (IV) where m=2)

The branched polyamine starting material, tris(2-aminoethyl)amine, abbreviated herein as Am2, was obtained from Tokyo Kasei Organic Chemicals, Japan.

POLYAMINE Am3 (the compound of the formula (IV) where m=3)

The branched polyamine starting material, tris(3-aminopropyl)amine, abbreviated herein as Am3 was obtained was obtained from Tokyo Kasei Organic Chemicals, Japan.

POLYSACCHARIDE 11+POLYAMINE Am2 (the compound of the formula (VI) where x=11 and m=2)

200 g of Polysaccharide 11 and 100 g of Polyamine Am2 were dissolved in 600 mL of deionized water contained in a 5 L beaker with stirring. An additional 100 g of Polyamine Am2 was added to the solution with stirring. Next the pH of the combined solution was adjusted to 8.90 by dropwise addition of 12 N hydrochloric acid with vigorous stirring. After deionized water was added to bring the total volume of the solution up to 1200 mL, the solution was set aside to stand at ambient temperature for 15 days. While stirring the solution vigorously, 50 g of sodium cyanoborohydride was added to the solution. The solution was stirred for 8 hours and then set aside to stand at ambient temperature for 4 days. While stirring the solution vigorously, the pH of the combined solution was adjusted to 2 by dropwise addition of 12 N hydrochloric acid solution. Next, 2 L of methanol was added with vigorous stirring. The product separated as an off-white solid from which the supernatant solution was decanted and discarded. The wet solid was washed with several portions of methanol and then collected by vacuum filtration. The solid was air dried and then dried under vacuum. The weight of dried solid was about 190 g.

POLYSACCHARIDE 11+POLYAMINE Am3 (the compound of the formula (VI) where x=11 and m=3)

This compound was prepared by an analogous method to that described above for Polysaccharide 11+Polyamine Am3, with the exception that Polyamine Am3 was used.

POLYSACCHARIDE 6+POLYAMINE Am2 (the compound of the formula (VI) where x=6 and m=2)

200 g of Polysaccharide 6 and 100 g of Polyamine Am2 dissolved in 600 mL of deionized water contained in a 2L beaker with stirring. An additional 100 g of Polyamine Am2 was added to the solution with stirring. Next, the pH of the combined solution was adjusted to 8.70 by dropwise addition of 12 N hydrochloric acid solution with vigorous stirring. The solution was set aside to stand at ambient temperature for 15 days. While stirring the solution vigorously, 50 g of sodium cyanoborohydride was added to the solution. The solution was stirred for 8 hours and then set aside to stand at ambient temperature for 4 days. Next the solution was transferred to a pear-shaped flask and most of the water was removed by evaporation using a rotary evaporator with a water bath temperature of slightly less than 50° C. The oily solid was transferred to a 2L beaker and washed with several portions of methanol, with the methanol washings being discarded. The solid was air dried and then dried under vacuum. The weight of dried solid was about 210 g.

POLYSACCHARIDE 6+POLYAMINE Am3 (the compound of the formula (VI) where x=6 and m=3)

This compound was prepared by an analogous method to that described above for Polysaccharide 6+Polyamine Am2, with the exception that Polyamine Am3 was used.

DISPERSANT A2 (the compound of the formula (I) where x=11, m=2, A=group (ii), and $R^1=R^2$=3-nitrophenyl 100 g of [Polysaccharide 11+Polyamine Am2] obtained above and 600 mL of deionized water were added to a 5 L beaker and then stirred with an overhead mechanical stirrer. To the resulting slurry were added 200 g of 3-nitrobenzaldehyde and 16 g of lithium hydroxide monohydrate. After stirring for several hours an emulsion formed. While stirring the mixture vigorously, 250 mL of a methanolic solution of tetraethylammonium cyanoborohydride, which was prepared by metathesis of 25 g of 95% sodium cyanoborohydride with 75 g of tetraethylammonium chloride in methanol, was added. The mixture was stirred for 8 hours and then set aside for 16 hours. The pH of the mixture was adjusted to 7.5 by the dropwise addition of 3 N hydrochloric acid solution and an additional 250 mL of a methanolic solution of tetraethylammonium cyanoborohydride, prepared exactly as above, was added. The mixture was stirred for 8 hours and then set aside for 16 hours. The pH of the mixture was adjusted to 6.0 by the dropwise addition of 3 N hydrochloric acid solution and stirred for an additional 8 hours. Next, the pH of the mixture was adjusted to 2.0 by the dropwise addition of 3 N hydrochloric acid solution while stirring vigorously. The mixture was set aside for 40 hours during which time a solid precipitated. The supernatant was decanted off from the solid and discarded. Next, 500 mL of N-methylpyrrolidinone and 100 g of piperonal were added to the solid. While stirring and warming the mixture at 45° C., the solid slowly dissolved. To the resulting solution was added 250 mL of a methanolic solution of tetraethylammonium cyanoborohydride, prepared exactly as above. The solution was stirred for 8 hours and then set aside for 16 hours. The pH of the mixture was adjusted to 5.5 by the dropwise addition of 3 N hydrochloric acid solution and an additional 250 mL of a methanolic solution of tetraethylammonium cyanoborohydride, prepared exactly as above, was added. The solution was stirred for 48 hours and then the pH was adjusted to 2.0 by the dropwise addition of 3 N hydrochloric acid solution while stirring vigorously. Isopropanol was added with stirring until the volume of the mixture reached a total of 5 L. A flocculent off-white precipitate formed during e addition of isopropanol The beaker was covered and set aside to stand for 40 hours. Most of the supernatant was decanted and the solid was isolated from the remaining mixture by centrifuging in 100 mL centrifuge tubes at 3000 rpm for 30 minutes. The separated solids were combined in a 2 L beaker and washed with several portions of 95% ethanol and then collected by vacuum filtration using a fine porosity (pore size: 16–40 microns) fritted glass filter. The solid was air-dried to a constant weight. The yield of product was about 120 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 6.5. While monitoring the pH of the mixture, an aqueous solution of lithium hydroxide monohydrate (5 wt. %) was added dropwise with stirring until the pH reached a constant value of 7.9. Additional water was added such that a total solution weight of 200 g was obtained. For the final step, the resulting solution was filtered through a 10 micrometer teflon membrane filter.

DISPERSANT B2 (the compound of the formula (I) where x=11, m=3, A=group (ii), $R^1=R^2$=3,4-dimethoxyphenyl This compound was prepared by an analogous method to that described above for Dispersant A2, with the exception that [Polysaccharide 11+Polyamine Am3] and veratraldehyde were used. A 200 g solution containing 30 g of Dispersant B2 was prepared as described above for Dispersant A2.

DISPERSANT C2 (the compound of the formula (I) where x=6, m=2, A=group (ii), and $R^1=R^2$=4-phenylpheny)

This compound was prepared by an analogous method to that described above for Dispersant A2, with the exception that [Polysaccharide 6+Polyamine Am2] and 4-phenylbenzaldehyde were used. A 200 g solution containing 30 g of Dispersant C2 was prepared as described above for Dispersant A2.

DISPERSANT D2 (the compound of the formula (I) where x=6, m=3, A=group (ii), $R^1=R^2$=2-phenylethylene)

This compound was prepared by an analogous method to that described above for Dispersant A2, with the exception that [Polysaccharide 6+Polyamine Am3] and cinnamaldehyde were used. A 200 g solution containing 30 g of Dispersant D2 was prepared as described above for Dispersant A2.

SUBSTITUTED POLYAMINE Am3a (the compound of the formula (XII) where m=3, $R^1$=9-anthryl, and $R^2$=4-cyanophenyl)

12 g of the branched polyamine in which m is 3, tris(3-aminopropyl)amine (Tokyo Kasei Organic Chemicals; Japan) and 39.9 g of 9-anthraldehyde were dissolved in 800 mL of 2-butanol contained in a 1 L beaker with stirring. The solution was stirred for one hour and then heated to boiling. The alcohol solvent was boiled off until approximately 350 mL of solvent remained. The solution was allowed to cool to ambient temperature and then placed in a minus 20° C. freezer overnight. On standing overnight the tris Schiff base product had separated from the solution. The alcohol supernatant was decanted from the solid and then 200 g of dimethylsulfoxide and 400 g of methanol were added, While stirring the mixture vigorously, 8 g of sodium borohydride was added. After stirring the mixture for 2 hours, a homogeneous solution was obtained. The solution was heated to boiling for 1 hour to destroy any residual unreacted sodium borohydride. After cooling the solution to ambient temperature, a freshly prepared solution of 16.7 g of 4-cyanobenzaldehyde in 200 g of dimethylsulfoxide was added with stirring. The combined solution was stirred at ambient temperature for 2 hours. Next, the solution was heated to 80° C. and held at that temperature for 2 hours. The solution was allowed to cool to ambient temperature and then 100 g of methanol and 6 g of sodium borohydride were added with stirring. The solution was stirred at ambient temperature for 4 hours and then heated to boiling for 3 hours to boil off the methanol and to destroy residual unreacted sodium borohydride. The substituted polyamine product was not isolated, but instead was used as a solution in dimethylsulfoxide in the preparations of Dispersant E2 and Dispersant F2 described below.

SUBSTITUTED POLYAMINE Am3b (the compound of the formula (XII) where m=3, $R^1$=2-fluorenyl and $R^2$=1-naphthyl)

12 g of the branched polyamine in which m in 3, tris(3-aminopropyl)amine (Tokyo Kasei Organic Chemicals; Japan) and 37.6 g of 2-fluorenecarboxaldehyde were dissolved in 800 mL of 2-butanol contained in a 1 L beaker with stirring. The solution was stirred for one hour and then heated to boiling. The alcohol solvent was boiled off until approximately 350 mL of solvent remained. The solution was allowed to cool to ambient temperature and then placed in a minus 20° C. freezer overnight. On standing overnight the tris Schiff base product had separated from the solution. The alcohol supernatant was decanted from the solid and then 200 g of dimethylsulfoxide and 400 g of methanol were added. While stirring the mixture vigorously, 8 g of sodium borohydride was added. After stirring the mixture for 2 hours, a homogeneous solution was obtained. The solution was heated to boiling for 1 hour to destroy any residual unreacted sodium borohydride. After cooling the solution to ambient temperature, a freshly prepared solution of 19.9 g of 1-naphthaldehyde in 200 g of dimethylsulfoxide was added with stirring. The combined solution was stirred at ambient temperature for 2 hours. Next, the solution was heated to 80° C. and held at that temperature for 2 hours. The solution was allowed to cool to ambient temperature and then 100 g of methanol and 6 g of sodium borohydride were added with stirring. The solution was stirred at ambient temperature for 4 hours and then heated to boiling for 3 hours to boil off the methanol and to destroy residual unreacted sodium borohydride. The substituted polyamine product was not isolated, but instead was used as a solution in dimethylsulfoxide in the preparations of Dispersant G2 and Dispersant H2 described below.

DISPERSANT E2 (the compound of the formula (I) where x=11, m=3, A=group (ii), $R^1$=9-anthryl, and $R^2$=4-cyanophenyl)

70 g of Polysaccharide 11, 40 g of trifluoroacetic acid, and 350 g of dimethylsulfoxide were added to a 1 L wide-mouthed polyethylene bottle. The bottle was capped and transferred to a 40° C. water bath. After warming for several hours, substantially all of the polysaccharide dissolved. Next, the bottle was removed from the water bath and opened. A dimethylsulfoxide solution (approximately 400 mL) of Substituted Polyamine Am3a was added to the polysaccharide solution. Immediately on mixing a gel formed. The gel was broken up using a small hand mixer for about 10 minutes. The mouth of the polyethylene bottle was wrapped with Teflon tape and the bottle was sealed. The bottle was loaded into a 60° C. constant temperature oven for 7 days. Next, the bottle was opened and the contents transferred to a 2 L beaker equipped with a magnetic still bar. While stirring the mixture vigorously, 320 mL of a methanolic solution of tetraethylammonium cyanoborohydride, which was prepared by metathesis of 40 g of 95% sodium cyanoborohydride with 115 g of tetraethylammonium chloride in methanol, was added. The mixture was stirred for 1 hour and then trifluoroacetic acid was added until all of the solids just dissolved (approximately 50 g). The resulting solution was stirred for an additional 24 hours. The solution was transferred to a 5 L beaker equipped with an overhead mechanical stirrer. While stirring the solution vigorously, isopropanol was added with until the volume of the mixture reached a total of 5 L. A flocculent off-white precipitate formed during the addition of isopropanol. The beaker was covered and set aside to stand for 40 hours. Most of the supernatant was decanted and the solid was isolated from the remaining mixture by centrifuging in 100 mL centrifuge tubes at 3000 rpm for 30 minutes. The separated solids were combined in a 2 L beaker and washed with several portions of 95% methanol and then collected by vacuum filtration using a fine porosity (pore size: 16–40 microns) fritted glass filter. The solid was air-dried to a constant weight. The yield of product was about 125 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 8.8. While monitoring the pH of the mixture, an aqueous solution of lithium hydroxide monohydrate (5 wt. %) was added dropwise with stirring until the pH reached a constant value of 9.0. Additional water was added such that a total solution weight of 200 g was obtained. For the final step, the resulting solution was filtered through a 10 micrometer Teflon membrane filter.

DISPERSANT F2 (the compound of the formula (I) where x=6, m=3, A=group (ii), $R^1$=9-anthryl, and $R^2$=4-cyanophenyl)

This compound was prepared by an analogous method to that described above for Dispersant E2, with the exception that Polysaccharide 6 was used. A 200 g solution containing 30 g of Dispersant F2 was prepared as described above for Dispersant E2.

DISPERSANT G2 (the compound of the formula (I) where x=11, m=3, A=group (ii), $R^1$=2-fluorenyl, and $R^2$=1-naphthyl)

This compound was prepared by an analogous method to that described above for Dispersant E2, with the exception that a dimethylsulfoxide solution (approximately 400 mL) of Substituted Polyamine Am3b was used. A 200 g solution containing 30 g of Dispersant G2 was prepared as described above for Dispersant E2.

DISPERSANT H2 (the compound of the formula (I) where x=6, m=3, A=group (ii), $R^1$=2-fluorenyl, and $R^2$=1-naphthyl)

This compound was prepared by an analogous method to that described above for Dispersant E2, with the exception that Polysaccharide 6 and a dimethylsulfoxide solution (approximately 400 mL) of Substituted Polyamine Am3b were used. A 200 g solution containing 30 g of dispersant H2 was prepared as described above for Dispersant E2.

Preparation of Pigment Dispersions

The dispersants obtained above, a pigment, and deionized water listed below were mixed, and the mixture was dispersed in an Eiger Motormill M250 VSE-EXJ (Eiger Japan, Tokyo, JAPAN). Glass beads (diameter: 1.0 mm), which had a total combined volume of 175 mL, were used as the milling media. Milling was carried out at 4500 rpm for a period of 50 hours.

| | |
|---|---|
| Pigment | 30 g |
| Dispersant (15 wt. % solids) | 60 g |
| deionized water | 160 g |

The yield of the pigment dispersion was about 200 g. This procedure was repeated four times and the five batches were combined with stirring in a polyethylene bottle. The dispersion combinations shown Table 1 below were prepared. For all of the dispersions, the average particle size was between 100 and 120 nanometers.

TABLE 1

| Dispersion | Pigment | Dispersant |
|---|---|---|
| Black-A1 | Black FW 18 (Degussa) | Dispersant A1 |
| Black-B1 | Black FW 18 (Degussa) | Dispersant B1 |
| Black-C1 | Black FW 18 (Degussa) | Dispersant C1 |
| Black-D1 | Black FW 18 (Degussa) | Dispersant D1 |
| Cyan-A1 | Toner Cyan B (Clariant) | Dispersant A1 |
| Cyan-B1 | Toner Cyan B (Clariant) | Dispersant B1 |
| Cyan-D1 | Toner Cyan B (Clariant) | Dispersant D1 |
| Yellow-B1 | Toner Yellow HG (Clariant) | Dispersant B1 |
| Yellow-D1 | Toner Yellow HG (Clariant) | Dispersant D1 |
| Magenta-C1 | Toner Magenta E0 (Clariant) | Dispersant C1 |
| Black-E1 | Black FW 18 (Degussa) | Dispersant E1 |
| Black-G1 | Black FW 18 (Degussa) | Dispersant G1 |
| Cyan-F1 | Toner Cyan B (Clariant) | Dispersant F1 |
| Cyan-H1 | Toner Cyan B (Clariant) | Dispersant H1 |
| Yellow-E1 | Toner Yellow HG (Clariant) | Dispersant E1 |
| Yellow-G1 | Toner Yellow HG (Clariant) | Dispersant G1 |
| Magenta-F1 | Toner Magenta E0 (Clariant) | Dispersant F1 |
| Magenta-H1 | Toner Magenta E0 (Clariant) | Dispersant H1 |

TABLE 2

| Dispersion | Pigment | Dispersant |
|---|---|---|
| Black-A2 | Black FW 18 (Degussa) | Dispersant A2 |
| Black-B2 | Black FW 18 (Degussa) | Dispersant B2 |
| Black-C2 | Black FW 18 (Degussa) | Dispersant C2 |
| Black-D2 | Black FW 18 (Degussa) | Dispersant D2 |
| Cyan-A2 | Toner Cyan B (Clariant) | Dispersant A2 |
| Cyan-B2 | Toner Cyan B (Clariant) | Dispersant B2 |
| Cyan-D2 | Toner Cyan B (Clariant) | Dispersant D2 |
| Yellow-B2 | Toner Yellow HG (Clariant) | Dispersant B2 |
| Yellow-D2 | Toner Yellow HG (Clariant) | Dispersant D2 |
| Magenta-C2 | Toner Magenta E0 (Clariant) | Dispersant C2 |
| Black-E2 | Black FW 18 (Degussa) | Dispersant E2 |
| Black-H2 | Black FW 18 (Degussa) | Dispersant H2 |
| Cyan-F2 | Toner Cyan B (Clariant) | Dispersant F2 |
| Cyan-H2 | Toner Cyan B (Clariant) | Dispersant H2 |

TABLE 2-continued

| Dispersion | Pigment | Dispersant |
|---|---|---|
| Yellow-F2 | Toner Yellow HG (Clariant) | Dispersant F2 |
| Yellow-G2 | Toner Yellow HG (Clariant) | Dispersant G2 |
| Magenta-E2 | Toner Magenta E0 (Clariant) | Dispersant E2 |
| Magenta-G2 | Toner Magenta E0 (Clariant) | Dispersant G2 |

Preparation of Ink Composition

The ingredients listed below were added sequentially to a beaker with stirring. The combined mixture was stirred for 3 hours. Next, the mixture was filtered through an 8 micron membrane filter.

| | |
|---|---|
| pigment disperion | 84 g |
| deionized water | see Tables 3 and 4 |
| humectant(s) | see Tables 3 and 4 |
| penetrating cosolvent(s) | see Tables 3 and 4 |
| Surfynol 465 (ethylene oxide adduct of an acetylenic diol; Air Products) | 2 g |

The ink combinations shown in tables below were prepared. In the table, the following abbreviations are used for the following cosolvents: glycerol=gly; glycerol ethoxylate= EG-1 (Liponic EG-1 from Lipo Chemicals Co., Paterson, N.J., USA); diethylene glycol=DEG; triethylene glycol= TRG; tetraethylene glycol=TeEG; diethylene glycol mono-n-butyl ether=DEG-mBE; triethylene glycol mono-n-butyl ether=TEG-mBE; 1,2-pentanediol=PD; and 1,2-hexanediol =HD.

TABLE 3

| | Pigment Dispersi | Water | Humectant(s) | Penetrating Cosolvent(s) |
|---|---|---|---|---|
| Example 101 | Black-A1 | 44 g | gly (22 g), TEG (10 g) | DEG-mBE (10 g) |
| Example 102 | Black-A1 | 42 g | gly (22 g), TeEG (10 g) | TEG-mBE (12 g) |
| Example 103 | Black-B1 | 50 g | gly (14 g), EG-1 (4), DEG (8) | DEG-mBE (10 g) |
| Example 104 | Black-B1 | 38 g | gly (22 g), DEG (14 g) | TEG-mBE (12 g) |
| Example 105 | Black-C1 | 38 g | gly (20 g), TEG (16 g) | HD (8 g), DEG-mBE (4 g) |
| Example 106 | Black-C1 | 38 g | gly (20 g), TeEG (16 g) | PD (8 g), DEG-mBE (4 g) |
| Example 107 | Black-D1 | 38 g | gly (20 g), DEG (16 g) | HD (6 g), DEG-mBE (6 g) |
| Example 108 | Black-D1 | 38 g | gly (20 g), DEG (16 g) | PD (6 g), DEG-mBE (6 g) |
| Example 109 | Cyan-A1 | 38 g | gly (24 g), TEG (14 g) | DEG-mBE (10 g) |
| Example 110 | Cyan-B1 | 39 g | gly (24 g), TeEG (13 g) | DEG-mBE (10 g) |
| Example 111 | Cyan-D1 | 36 g | gly (24 g), TEG (14 g) | TEG-mBE (12 g) |
| Example 112 | Cyan-A1 | 43.5 g | gly (20 g), EG-1 (0.5), | DEG-mBE (10 g) |
| Example 113 | Cyan-B1 | 43.5 g | gly (20 g), EG-1 (0.5), | DEG-mBE (10 g) |
| Example 114 | Cyan-D1 | 41.5 g | gly (20 g), EG-1 (0.5), | TEG-mBE (12 g) |

TABLE 3-continued

| | Pigment Dispersi | Water | Humectant(s) | Penetrating Cosolvent(s) |
|---|---|---|---|---|
| Example 115 | Yellow-B1 | 38 g | gly (24 g), TEG (14 g) | DEG-mBE (10 g) |
| Example 116 | Yellow-D1 | 39 g | gly (24 g), TeEG (13 g) | DEG-mBE (10 g) |
| Example 117 | Yellow-D1 | 38 g | gly (24 g), TEG (14 g) | DEG-mBE (10 g) |
| Example 118 | Yellow-B1 | 39 g | gly (24 g), TeEG (13 g) | DEG-mBE (10 g) |
| Example 119 | Magenta-C1 | 45.5 g | gly (20 g), EG-1 (0.5), | HD (6 g), TEG-mBE (4 g) |
| Example 120 | Magenta-C1 | 45.5 g | gly (20 g), EG-1 (0.5), | HD (6 g), TEG-mBE (4 g) |
| Example 121 | Black-E1 | 74 g | gly (24 g), TEG (6 g) | HD (8 g), DEG-mBE (4 g) |
| Example 122 | Black-E1 | 75.5 g | gly (20 g), EG-1 (0.5), | TEG-mBE (12 g) |
| Example 123 | Black-G1 | 60 g | gly (25 g), TeEG (15 g) | DEG-mBE (16 g) |
| Example 124 | Cyan-F1 | 62 g | gly (22 g), DEG (18 g) | TEG-mBE (14 g) |
| Example 125 | Cyan-H1 | 64 g | gly (20 g), TEG (16 g) | DEG-mBE (16 g) |
| Example 126 | Cyan-F1 | 66 g | gly (24 g), TEG (14 g) | PD (4 g), HD (4 g), |
| Example 127 | Yellow-E1 | 65 g | gly (22 g), TeEG (14 g) | PD (4 g), HD (5 g), |
| Example 128 | Yellow-G1 | 79.5 g | gly (20 g), EG-1 (0.5), | DEG-mBE (10 g) |
| Example 129 | Magenta-F1 | 74 g | gly (27 g), DEG (7 g) | HD (6 g) DEG-mBE (2 g) |
| Example 130 | Magenta-H1 | 74 g | gly (26 g), TeEG (7 g) | PD (7 g) DEG-mBE (2 g) |

TABLE 4

| | Pigment Dispersi | Water | Humectant(s) | Penetrating Cosolvent(s) |
|---|---|---|---|---|
| Example 201 | Black-A2 | 44 g | gly (22 g), TEG (10 g) | DEG-mBE (10 g) |
| Example 202 | Black-A2 | 42 g | gly (22 g), TeEG (10 g) | TEG-mBE (12 g) |
| Example 203 | Black-B2 | 50 g | gly (14 g), EG-1 (4), DEG (8) | DEG-mBE (10 g) |
| Example 204 | Black-B2 | 38 g | gly (22 g), DEG (14 g) | TEG-mBE (12 g) |
| Example 205 | Black-C2 | 38 g | gly (20 g), TEG (16 g) | HD (8 g), DEG-mBE (4 g) |
| Example 206 | Black-C2 | 38 g | gly (20 g), TeEG (16 g) | PD (8 g), DEG-mBE (4 g) |
| Example 207 | Black-D2 | 38 g | gly (20 g), DEG (16 g) | HD (6 g), DEG-mBE (6 g) |
| Example 208 | Black-D2 | 38 g | gly (20 g), DEG (16 g) | PD (6 g), DEG-mBE (6 g) |
| Example 209 | Cyan-A2 | 38 g | gly (24 g), TEG (14 g) | DEG-mBE (10 g) |
| Example 210 | Cyan-B2 | 39 g | gly (24 g), TeEG (13 g) | DEG-mBE (10 g) |
| Example 211 | Cyan-D2 | 36 g | gly (24 g), TEG (14 g) | TEG-mBE (12 g) |
| Example 212 | Cyan-A2 | 43.5 g | gly (20 g), EG-1 (0.5), | DEG-mBE (10 g) |
| Example 213 | Cyan-B2 | 43.5 g | gly (20 g), EG-1 (0.5), | DEG-mBE (10 g) |
| Example 214 | Cyan-D2 | 41.5 g | gly (20 g), EG-1 (0.5), | TEG-mBE (12 g) |
| Example 215 | Yellow-B2 | 38 g | gly (24 g), TEG (14 g) | DEG-mBE (10 g) |
| Example 216 | Yellow-D2 | 39 g | gly (24 g), TeEG (13 g) | DEG-mBE (10 g) |
| Example 217 | Yellow-D2 | 38 g | gly (24 g), TEG (14 g) | DEG-mBE (10 g) |
| Example 218 | Yellow-B2 | 39 g | gly (24 g), TeEG (13 g) | DEG-mBE (10 g) |
| Example 219 | Magenta-C2 | 45.5 g | gly (20 g), EG-1 (0.5), | HD (6 g), TEG-mBE (4 g) |
| Example 220 | Magenta-C2 | 45.5 g | gly (20 g), EG-1 (0.5), | HD (6 g), TEG-mBE (4 g) |
| Example 221 | Black-E2 | 75.5 g | gly (20 g), EG-1 (0.5), | PD (6 g), HD (4 g), |
| Example 222 | Black-E2 | 73.5 g | gly (20 g), EG-1 (0.5), | DEG-mBE (14 g) |
| Example 223 | Black-H2 | 77.5 g | gly (20 g), EG-1 (0.5), | HD (7 g), TEG-mBE (3 g) |
| Example 224 | Cyan-F2 | 70 g | gly (24 g), DEG (12 g) | HD (6 g), TEG-mBE (4 g) |
| Example 225 | Cyan-H2 | 70 g | gly (22 g), DEG (14 g) | HD (5 g), TEG-mBE (5 g) |
| Example 226 | Cyan-H2 | 74 g | gly (24 g), TeEG (10 g) | HD (6 g), TEG-mBE (2 g) |
| Example 227 | Yellow-F2 | 79.5 g | gly (20 g), EG-1 (0.5), | PD (6 g), DEG-mBE (2 g) |
| Example 228 | Yellow-G2 | 72.5 g | gly (20 g), EG-1 (0.5), | TEG-mBE (15 g) |
| Example 229 | Magenta-E2 | 75 g | gly (23 g), DEG (10 g) | HD (6 g) TEG-mBE (2 g) |
| Example 230 | Magenta-G2 | 73 g | gly (26 g), TEG (8 g) | PD (8 g) DEG-mBE (1 g) |

Evaluation Tests

The compositions above were evaluated according to their printability at a fast printing speed, general reliability, drying speed, and color bleed as described below.

Continuous Printing Test

The ink composition was loaded into a heat-sealable aluminum pack, degassed, and then allowed to equilibrate with respect to dissolved gases in a sealed glass vessel for a period of two weeks. The equilibrated ink was removed from the vessel and the heat-sealable aluminum pack was sealed. Next, the ink was loaded into the black-ink print head of a PM-900C printer (Product Name, Seiko Epson Corporation). A line pattern which uses all of the nozzles was printed initially to establish that ink was being ejected from all nozzles with good directionality (angular deviation of an ejected ink droplet from a nozzle is within about ±0.5° from the normal to the plane of the nozzle). The printing pattern was changed a 360 dots per inch solid block pattern which fills an A4 size sheet of paper. This printing speed was fast at about 4 pages per minute. The block pattern was printed continuously for 200 sheets. For all of the ink compositions, all nozzles showed good directionality and no non-printing nozzles were observed for all 200 sheets.

Long Term Storage Test

The ink composition was degassed and sealed in a heat-sealable aluminum pack. Next, the ink was loaded into the black ink print head of an MJ-510C printer (Product Name, Seiko Epson Corporation). A line pattern which uses all of the nozzles was printed initially to establish that ink was is being ejected from all nozzles with good directionality. Next, the ink supply was removed from the print head, and then the print head was removed from the printer. The uncapped print head was stored for 4 days at 40° C. in a constant temperature oven. The print head was reattached to the printer and the ink supply was reattached to the print head. The cleaning operation of the printer was executed followed by a line pattern which uses all of the nozzles. The cleaning operation followed by the line pattern was repeated until all of the nozzles printed with good directionality. For all of the ink compositions, the number of cleaning operations necessary for full recovery was less than or equal to 4, a level which indicates an acceptable level of reliability.

Thermal Cycling Test

The ink was degassed and sealed in a 30 mL glass sample bottle. The sample bottle was loaded into a 60° C. constant temperature oven and stored at that temperature condition for 24 hours. The sample was removed from the oven and transferred to a −30° C. constant temperature refrigerator and stored at that temperature condition for 24 hours. This two temperature cycle was repeated such that a total of ten cycles was completed. After the last cycle, the ink was thawed to room temperature, the glass sample bottle was inverted without shaking, and the bottom of the sample bottle was examined for precipitates. For all of the ink compositions, no precipitates were observable, a level which indicates an acceptable level of reliability.

Drying Time Test

The drying time of the ink compositions was evaluated by printing a series of solid block patterns and wiping the patterns in 5 second increments. The printing was carried out using an MJ-930C printer (Product Name, Seiko Epson Corporation) and Xerox 4024 as the paper. For all of the ink compositions, the drying time was less than 5 seconds, a level which indicates acceptably fast drying.

Color-Bleed Test

The color-bleed print quality was evaluated by printing a geometric block pattern having one color in the form of diagonal lines superimposed on a block of another color. In the block pattern, the two colors being evaluated are printed both as lines and blocks. It should be noted, however, that the two colors are printed adjacently and not with one on top of the other. The printing was carried out using an MJ-930C printer (Product Name, Seiko Epson Corporation) and Xerox 4024 as the paper. As a comparison sample, the same geometric block pattern was printed using the yellow and black dye based inks which come with the MJ-930C printer. The print samples of the sample inks were evaluated according to the following standards:

A: a level of color bleed displaying a clean border between the two colors, which is equal to or better than that of the dye based ink;

B: a level of color bleed displaying some mutual invasion of one color into the other, which is slightly worse than that of the dye based ink; and C: a level of color bleed displaying excessive mutual invasion of one color into the other, which is significantly worse than that of the dye based ink.

To all of the ink compositions listed below in Tables 5 and 6, Grade A was assigned.

TABLE 5

| Sample Pair | |
|---|---|
| Example 101 | Example 109 |
| Example 102 | Example 110 |
| Example 103 | Example 111 |
| Example 104 | Example 115 |

TABLE 5-continued

| Sample Pair | |
|---|---|
| Example 105 | Example 116 |
| Example 106 | Example 117 |
| Example 107 | Example 118 |
| Example 108 | Example 120 |
| Example 112 | Example 115 |
| Example 113 | Example 118 |
| Example 114 | Example 119 |
| Example 116 | Example 119 |
| Example 117 | Example 120 |
| Example 116 | Example 120 |
| Example 117 | Example 119 |
| Example 121 | Example 124 |
| Example 122 | Example 127 |
| Example 123 | Example 129 |
| Example 124 | Example 127 |
| Example 125 | Example 129 |
| Example 126 | Example 128 |
| Example 127 | Example 130 |
| Example 128 | Example 129 |

TABLE 6

| Sample Pair | |
|---|---|
| Example 201 | Example 209 |
| Example 202 | Example 210 |
| Example 203 | Example 211 |
| Example 204 | Example 215 |
| Example 205 | Example 216 |
| Example 206 | Example 217 |
| Example 207 | Example 218 |
| Example 208 | Example 220 |
| Example 212 | Example 215 |
| Example 213 | Example 218 |
| Example 214 | Example 219 |
| Example 216 | Example 219 |
| Example 217 | Example 220 |
| Example 216 | Example 220 |
| Example 217 | Example 219 |
| Example 221 | Example 225 |
| Example 222 | Example 226 |
| Example 223 | Example 228 |
| Example 224 | Example 227 |
| Example 225 | Example 228 |
| Example 226 | Example 229 |
| Example 227 | Example 229 |
| Example 228 | Example 230 |

What is claimed is:

1. A pigment dispersed aqueous ink jet ink composition comprising water as the principal solvent, a water-soluble organic solvent, and a polysaccharide compound represented by the formula:

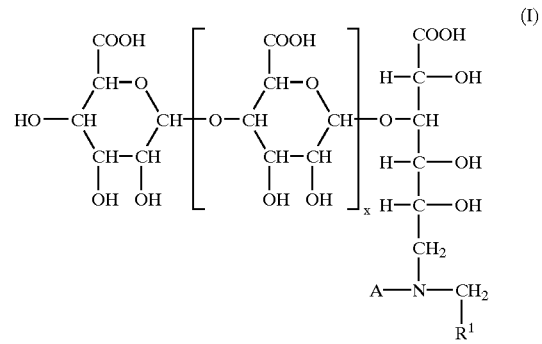

wherein
A represents a group represented by the following formula (i) or (ii):

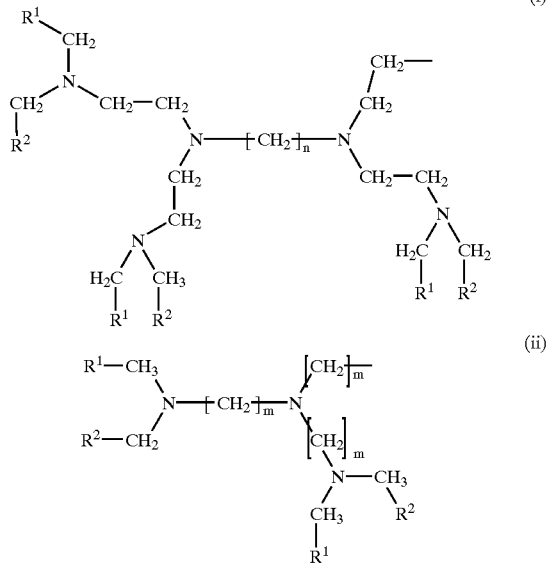

x is the average value for the compound of the formula (I) in the ink composition and is in the range from 4 to 14,
n is in the range from 2 to 12,
m is either 2 or 3, and
$R^1$ and $R^2$ independently represent a $C_{5-20}$ aryl group which may be substituted, an aralkyl group which may be substituted, and the heterocyclic ring containing at least one nitrogen atom, which ring may be substituted.

2. The ink composition of claim 1, wherein $R^1$ is the same as $R^2$ in the formula (I).

3. The ink composition of claim 1, wherein $R^1$ is not the same as $R^2$ in the formula (I).

4. The ink composition of claim 1, wherein A is the group represented by the formula (i) in the formula (I).

5. The ink composition of claim 1, wherein A is the group represented by the formula (ii) in the formula (I).

6. The ink composition of claim 1, wherein the water-soluble organic solvent is selected from the group consisting of a humectant, a penetrating cosolvent, and surfactant.

7. The ink composition of claim 1, wherein the 0.1 to 10% by weight of pigment and 0.1 to 20% by weight of the compound of the formula (I).

8. The ink composition of claim 1, wherein the humectant is selected from the group consisting of glycerol, glycerol ethoxylate, diethylene glycol, triethylene glycol, and tetraethylene glycol.

9. The ink composition of claim 1, wherein the penetrating cosolvent is selected from the group consisting of diethylene glycol mono-n-butyl ether, triethylene glycol mono-n-butyl ether, 1,2-pentanediol, and 1,2-hexanediol.

10. The ink composition of claim 1, wherein the surfactant is selected from the group consisting of an acetylenic diol and/or an ethylene oxide adduct of an acetylenic diol.

11. The ink composition of claim 1, wherein the surface tension is in the range of approximately 30 to 40 dyne/cm and the viscosity is in the range of approximately 1.0 to 10.0 mPas.

12. The ink composition of claim 1, wherein average particle size of dispersed pigment is in the range of approximately 20 to 150 nanometers.

13. The ink composition of claim 1, wherein the polysaccharide portion of the compound of the formula (I) is neutralized with a neutralizing agent selected from the group consisting of organic bases, alkanolamines, alkali metal hydroxides, and mixtures thereof.

14. The ink composition of claim 13, wherein the neutralizing agent is lithium hydroxide.

15. A painting method comprising depositing an ink of composition of claim 1 onto a recording medium.

16. An ink jet printing method comprising ejecting and depositing droplets of an ink composition of claim 1 onto a recording medium.

17. A recorded medium recorded by the method of claim 16.

* * * * *